(12) United States Patent
Kajikawa

(10) Patent No.: US 8,988,777 B2
(45) Date of Patent: Mar. 24, 2015

(54) LASER IRRADIATION DEVICE AND LASER PROCESSING METHOD

(75) Inventor: Toshikazu Kajikawa, Kobe (JP)

(73) Assignee: Seishin Trading Co., Ltd., Hyogo (JP)

( * ) Notice: Subject to any disclaimer, the term of this patent is extended or adjusted under 35 U.S.C. 154(b) by 443 days.

(21) Appl. No.: 13/138,402

(22) PCT Filed: May 26, 2010

(86) PCT No.: PCT/JP2010/058928
§ 371 (c)(1),
(2), (4) Date: Sep. 23, 2011

(87) PCT Pub. No.: WO2011/001765
PCT Pub. Date: Jan. 6, 2011

(65) Prior Publication Data
US 2012/0012758 A1  Jan. 19, 2012

(30) Foreign Application Priority Data
Jun. 29, 2009  (JP) .................. 2009-153775

(51) Int. Cl.
*B23K 26/06* (2014.01)
*B23K 26/00* (2014.01)
*B23K 26/40* (2014.01)

(52) U.S. Cl.
CPC ......... *B23K 26/0617* (2013.01); *B23K 26/0057* (2013.01); *B23K 26/4075* (2013.01)
USPC ............. 359/489.01; 359/489.07; 219/121.67

(58) Field of Classification Search
CPC .......... G02B 5/30–5/3091; G02B 5/32; B23K 26/00–26/0096; B23K 26/067; B23K 26/0676; B23K 26/04; B23K 26/0648; B23K 26/0656; B23K 26/0665; B23K 26/06; B23K 26/0604; B23K 26/0639; B23K 26/0673; B23K 26/08; B23K 26/0807; B23K 26/1405; B23K 26/422; B23K 26/032; B23K 26/0608; B23K 26/0613; B23K 26/0621; B23K 26/063; B23K 26/0643; B23K 26/0652; B23K 26/073; B23K 26/0823; B23K 26/0853; B23K 26/10; B23K 26/106; B23K 26/1458; B23K 26/24; B23K 26/38; B23K 26/381; B23K 26/405; B23K 2201/007; B23K 2201/14; B23K 2201/16; B23K 2201/18; B23K 9/1274; B41M 5/24; B41M 5/26
USPC ................. 359/350, 352, 355–357, 434–435, 359/483.01, 489.01, 489.07; 250/492.1–492.3; 219/121.6–121.62, 219/121.67–121.86
See application file for complete search history.

(56) References Cited

U.S. PATENT DOCUMENTS 5,051,575 A * 9/1991 Hino ............................. 250/225
5,955,243 A * 9/1999 Tanitsu ......................... 359/744

(Continued)

FOREIGN PATENT DOCUMENTS

| CN | 1642867 | 7/2005 |
|---|---|---|
| CN | 1925945 | 3/2007 |
| JP | 2003-053578 | 2/2003 |
| JP | 1 721 695 | 3/2005 |
| JP | 2006-192503 | 7/2006 |
| JP | 2006-525874 | 11/2006 |
| JP | 2007-000931 | 1/2007 |
| JP | 2007-290932 | 11/2007 |
| JP | 2008036641 | 2/2008 |
| JP | 2009-131976 | 6/2009 |
| WO | WO-2004-105995 | 12/2004 |

*Primary Examiner* — Suchin Parihar
*Assistant Examiner* — Jeffrey Madonna
(74) *Attorney, Agent, or Firm* — Jordan and Hamburg LLP

(57) ABSTRACT

Provided is a laser irradiation device for use in laser processing, and a laser processing method performed using the same. Provided is a laser irradiation device including: a light source that emits a laser beam; and an irradiation optical system which has one or a plurality of lenses, and is provided for light-guiding and light-converging of the laser beam emitted from the light source to the target substance, in which a birefringent material is used as a material entity of at least one lens of the irradiation optical system. Also provided is a laser processing method. The irradiation optical system may have a beam expander having a first lens that is a concave lens or a convex lens, and a second lens that is a convex lens, in the order along the laser-beam travel direction, the beam expander being configured so as to make the interval between the first lens and the second lens variable, in which a birefringent material may be used as a material entity of the first lens and/or the second lens. Thus, the interval between the lenses can be changed by a convenient operation, whereby relative positions between the plurality of beam waists (interval) can be easily regulated.

9 Claims, 9 Drawing Sheets

(56) References Cited

U.S. PATENT DOCUMENTS

| | | | |
|---|---|---|---|
| 6,057,970 A * | 5/2000 | Kim et al. | 359/721 |
| 6,870,668 B2 * | 3/2005 | Ozawa | 359/352 |
| 7,858,901 B2 | 12/2010 | Krishnan et al. | |
| 2003/0086171 A1 * | 5/2003 | McGuire | 359/497 |
| 2005/0006361 A1 * | 1/2005 | Kobayashi et al. | 219/121.73 |
| 2005/0109742 A1 * | 5/2005 | Nagai et al. | 219/121.73 |
| 2006/0021978 A1 | 2/2006 | Alexeev et al. | |
| 2006/0086704 A1 * | 4/2006 | Nagai et al. | 219/121.72 |
| 2006/0186099 A1 | 8/2006 | Bertez et al. | |
| 2006/0261050 A1 | 11/2006 | Krishnan et al. | |
| 2006/0266744 A1 | 11/2006 | Nomaru | |
| 2006/0289410 A1 * | 12/2006 | Morita et al. | 219/121.67 |
| 2007/0296941 A1 * | 12/2007 | Omura | 355/67 |
| 2009/0194516 A1 * | 8/2009 | Deshi | 219/121.71 |

\* cited by examiner

LASER IRRADIATION DEVICE AND LASER PROCESSING METHOD

BACKGROUND OF THE INVENTION

The present invention relates to a laser irradiation device for use in laser processing of ceramics, etc., and a laser processing method performed using the same.

Circuit boards and the like equipped with electronic parts have been produced using a hard and brittle material such as a ceramics material, glass material, silicon material or the like. In order to cut a board formed from such a hard and brittle material, it is necessary to form a groove on the surface of the board, or to form fine holes inside the board. As means for the formation, laser processing has been widely used. In laser processing, a laser beam emitted from a light source is converged using an irradiation optical system such as a lens, and a laser converged spot (beam waist) having an elevated power density is irradiated on the surface or the interior of the board to execute the processing.

At present, in attempts to miniaturize electronic parts and to improve process yield of boards by decreasing the processing site, fine grooves or holes are formed on and/or in the board, and formation of deeper grooves or holes has been demanded. Also, in hole processing, formation of finer holes with a lower degree of tapering has been demanded. In order to realize such demands taking advantages of characteristics of beam waist of a converged laser beam, it is preferable to form a plurality of focal points along an optical axis direction. In addition, characteristics of the beam waist are determined by properties of an irradiation optical system (particularly, light converging lens), which will be used subsequently, based on the wavelength and beam quality of the laser beam.

Methods for forming a plurality of focal points along an optical axis direction of a laser beam include: (A) a method in which a bifocal lens is used to allow the laser beam to be converged at a plurality of focal points (see JP-A No. 2006-192503); (B) a method in which a beam splitter is used to spatially split a laser beam, and a beam divergence angle of one of the split beams is altered and resynthesized, followed by converging on a processed face with a single light converging lens (see JP-A (Japanese translation of PCT international application) No. 2006-525874); (C) a method in which a plurality of times of processing are repeated while mechanically switching a plurality of lenses having different focal lengths (see JP-A No. 2007-290932), and the like.

However, according to the above method (A), a special light converging means such as a lens having a unique shape is needed. Further, the above method (B) involves problems in production and preparation as it is difficult to allow optical axes of synthesized two laser beams to agree with one another, and a reflecting surface having a large curvature radius must be provided. Furthermore, according to the above method (C), there arise problems of impairment of processing efficiency, and deterioration positional accuracy among each of processings, and the like.

PRIOR ART DOCUMENT

Patent Document 1: JP-A No. 2006-192503
Patent Document 2: JP-A (Japanese translation of PCT international application) No. 2006-525874
Patent Document 3: JP-A No. 2007-290932

SUMMARY OF THE INVENTION

The present invention was made in view of the foregoing problems, and an object of the invention is to provide a laser irradiation device in which formation of a plurality of beam waists is enabled by an irradiation optical system having a convenient configuration, and the interval of the plurality of beam waists can be easily altered and adjusted on the optical axis of the laser beam. Further provided by the present invention is a laser processing method performed using the laser irradiation device.

Means for Solving the Problems

An aspect of the invention made in order to solve the foregoing problems is a laser irradiation device comprising:
a light source that emits a laser beam; and
an irradiation optical system which has one or a plurality of lenses, and is provided for light-guiding and light-converging of the laser beam emitted from the light source to the target substance, wherein
a birefringent material is used as a material entity of at least one lens of the irradiation optical system.

The laser irradiation device has a simple and convenient configuration in which a birefringent material is used as a material entity of at least one lens of the irradiation optical system. By thus using a birefringent material as a material entity of at least one lens of the irradiation optical system, components of the laser beam emitted from the light source are split into ordinary light and extraordinary light without carrying out spatial splitting, and a plurality of beam waists slightly split can be formed on the optical axis of the irradiation optical system by utilizing the refractive index difference between the ordinary light and the extraordinary light. When such a simple and convenient configuration is employed, the laser irradiation device can surely and easily form a plurality of beam waists.

The irradiation optical system may have a beam expander having a first lens that is a concave lens or a convex lens, and a second lens that is a convex lens, in the order along the laser-beam travel direction, the beam expander being configured so as to make the interval between the first lens and the second lens variable, in which a birefringent material may be used as a material entity of the first lens and/or the second lens. Thus, relative positions (interval) between a plurality of beam waists can be easily regulated by a convenient operation of changing the interval between the lenses.

The irradiation optical system may include a light converging lens disposed at the last position along the laser-beam travel direction, and a birefringent material may be used as the material entity of this light converging lens. Thus, the light converging lens in the irradiation optical system has birefringency, and it is not necessary to separately provide and dispose a lens produced using a birefringent material as a material entity, whereby simplification of the irradiation optical system can be achieved.

The crystal orientation of the lens produced using the birefringent material as a material entity may be orthogonal to the optical axis direction of the irradiation optical system. When the crystal orientation of the lens produced using the birefringent material as a material entity is orthogonal to the optical axis direction of the irradiation optical system, components of the laser beam emitted from the light source can be surely and efficiently split into ordinary light and extraordinary light.

The material entity of the birefringent material is preferably optical crystalline quartz. When optical crystalline quartz is thus employed as a material entity of the birefringent material, high intensity of light resistance against laser beam emitted from the light source can be achieved while forming the aforementioned a plurality of beam waists, along with capable of attaining high transmittance for a wide wavelength range.

The laser irradiation device may have a relative shifting means for allowing the position of the target substance to relatively shift with respect to the irradiation optical system in two orthogonal directions on a face that is perpendicular to the optical axis of the irradiation optical system, and also in an optical axis direction. Thus, continuous groove processing and hole processing of the target substance can be rapidly carried out, and adjustment of the focal depth of the processing site is enabled, whereby precision level and process yield in cutting processing of ceramics and the like can be improved.

The irradiation optical system may include a half-wave plate that is rotatable about the optical axis, which half-wave plate may be disposed ahead of the lens produced using the birefringent material as a material entity, with respect to the laser-beam travel direction. Thus, intensity ratios of a plurality of beam waists can be altered continuously and easily.

In addition, the irradiation optical system may include a quarter-wave plate, and the quarter-wave plate may be disposed backward of the lens produced using the birefringent material as a material entity, with respect to the laser-beam travel direction. Accordingly, linear polarization of the laser beam is converted into circular polarization, and thus influences of polarization are eliminated from the plurality of beam waists, whereby stabilization of processing characteristics can be ensured.

The wavelength of the laser beam is preferably 200 nm or greater and 11 µm or less. When the wavelength of the laser beam falls within the above range, a laser output principally suited for laser processing of ceramics, etc., can be realized, and improvement of certainty and efficiency of the laser processing of ceramics, etc., is enabled.

An oscillation means of the laser beam may be for continuous-wave operation or pulse operation. When the oscillation means of the laser beam is thus for continuous-wave operation or pulse operation, processing details can be regulated depending on the type and properties of the processed material, and a wide variety of processing can be achieved.

Another aspect of the invention made in order to solve the aforementioned problems is to provide a laser processing method performed using the laser irradiation device described above. By employing such a laser processing method, fine groove(s) and/or hole(s) can be formed on/in board of ceramics, etc., and the groove and the hole formed thereby can be deeper.

In this laser processing method, an interval of the plurality of beam waists formed by the laser irradiation device may be adjusted to from 0.5 times to 10 times the Rayleigh length. When the interval of the beam waists falls within this range, a great focal depth can be attained in the state in which a small diameter of the beam waist is maintained.

The "optical axis of the irradiation optical system" as referred to herein means the optical axis of a portion of the target substance of irradiation or the lens to be the object of contrast of this optical axis. The term "beam waist" herein means a light converging spot of the laser beam converged.

Effects of the Invention

As explained in the foregoing, the laser irradiation device and the laser processing method of the present invention can surely and easily form a plurality of beam waists, and as a result, fine processing with a great focal depth can be rapidly realized on the target substance. Moreover, by regulating the positions of the plurality of beam waists, the most appropriate processing to meet the type of the processed object (for example, ceramics, glass, sapphire, etc.) can be achieved. It is to be noted that also in hole-opening processing of boards such as green sheets, fine processing accompanied by less taper can be realized.

BRIEF DESCRIPTION OF THE DRAWINGS

FIG. 11 shows a graph illustrating a correlation between relative position of the focus and scribe depth proportion in Example 5 and Comparative Example 2.

DESCRIPTION OF THE PREFERRED EMBODIMENTS

Hereinafter, preferred modes for carrying out the present invention are explained in detail with appropriate references to drawings.

Figure 1:
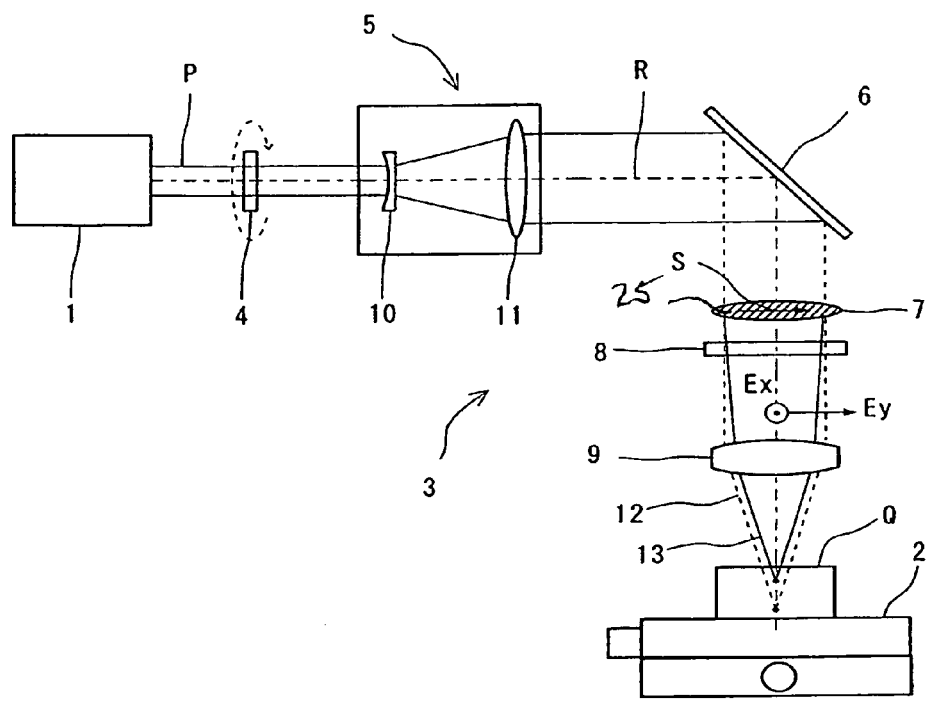
FIG. 1 shows a schematic configuration diagram illustrating a laser irradiation device according to one embodiment of the present invention.

The laser irradiation device shown in FIG. 1 is principally provided with a light source 1, a stage 2, and an irradiation optical system 3.

The light source 1 emits laser beam P. The type of the light source 1 is not particularly limited, and for example, a gas laser such as a $CO_2$ laser, a solid laser such as a Nd:YAG laser, an ultrashort pulse laser such as a femto sec laser, and the like may be included. In particular, for carrying out fine processing with a great focal depth on circuit boards formed using a hard and brittle material such as a ceramics material, and the like, a Nd:YAG laser is preferred. When an ultrashort pulse laser is used, self focusing or filamentation occurs in combination at a light converging site; therefore, thermal effect on and around the processing site can be suppressed, and attaining still greater focal depth is enabled.

The wavelength of the laser beam of light source 1 is preferably 200 nm or greater and 11 μm or less, and particularly preferably 240 nm or greater and 1600 nm or less. When the wavelength of the laser beam falls within the above range, optimal laser output for cutting processing of a circuit board formed using a hard and brittle material such as a ceramics material, and the like can be realized, and efficiency and certainty of the laser processing can be improved.

As an oscillation means of the laser beam for the light source 1, a continuous-wave operation or pulse operation is preferably employed. By providing continuous-wave operation with this oscillation means of the laser beam, constant laser output can be continuously oscillated. In addition, by providing pulse operation, a laser pulse having a high peak power can be obtained, and thus efficient processing is enabled with diminished thermal effect layer. As a result, the most appropriate processing to meet the type and properties of the processed material can be realized.

The stage 2 is used for mounting a target substance Q. Specific structure of this stage 2 is not particularly limited, and for example, a transparent plate that allows the laser beam to transmit through, a table provided with an opening such as a slit at a position of irradiation of the laser beam, or the like may be adopted.

The stage 2 has a relative shifting means for allowing the position of the target substance Q with respect to the irradiation optical system 3 to relatively shift along the direction of the optical axis R (Z axis direction) in addition to two orthogonal directions on a face that is perpendicular to the optical axis R of the irradiation optical system 3 (X axis direction, and Y axis direction). Such a relative shifting means enables continuous groove processing and/or hole processing on the target substance Q to be rapidly carried out, along with enabling the focal depth of the processing site to be adjusted. Particularly, when a miniaturized board is subjected to cutting processing, precision level of the processing can be improved, and the process yield can be also improved. It should be noted that specific structure of the shifting means of the stage 2 is not particularly limited, and any well-known means may be employed.

The irradiation optical system 3 guides and converges the laser beam P emitted from the light source 1 to the target substance Q. This irradiation optical system 3 has a half-wave plate 4, a beam expander 5, a mirror 6, a birefringent lens 7, a quarter-wave plate 8 and a light converging lens 9 in the order along the travel direction of the laser beam P.

Figure 2:
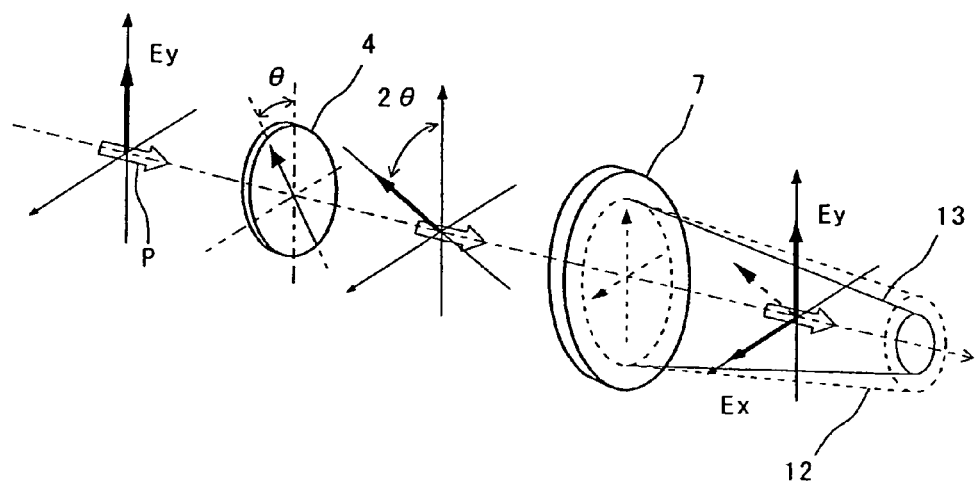
FIG. 2 shows a schematic configuration diagram illustrating the mechanism of formation of two beam waists by the laser irradiation device shown in FIG. 1.

The half-wave plate 4 is disposed ahead of the birefringent lens 7 along the travel direction of the laser beam P, and rotates the electric field vector of the laser beam. With respect to details of such a construction shown in FIG. 2, provided that the angle formed by the slow axis of the half-wave plate 4 and the electric field vector ($E_y$) of the incoming laser beam is defined as θ, electric field vector after the transmission is rotated by 2θ when the laser beam P transmits through the half-wave plate 4.

This half-wave plate 4 can rotate around the around the optical axis R of the irradiation optical system 3, and depending on the rotation angle, alteration of an intensity ratio of ordinary light component $E_x$ that is perpendicular to the slow axis, and extraordinary light component $E_y$ that is orthogonal thereto is enabled. Thus, the intensity ratio of two beam waists can be continuously and easily altered, and as a result, regulation of details of the processing is enabled to meet the type of the processed material, and the efficiency of the laser processing is improved. The rotation means of the half-wave plate 4 is not particularly limited, and any well-known means may be employed.

The beam expander 5 has a concave lens 10 that is the first lens and a convex lens 11 that is the second lens, in the order along the travel direction of the laser beam P. This concave lens 10 is specifically a plano-concave lens, which is disposed such that the laser beam P enters into the concave face, and expands the laser beam P emitted from the light source 1. In addition, the convex lens 11 is specifically a plano-convex lens, which is disposed such that the laser beam P enters into the convex face, and changes the laser beam P expanded by the concave lens 10 into a parallel luminous flux. The type of such a concave lens 10 includes a plano-concave lens, as well as a biconcave lens, a concave meniscus lens and the like, whereas the type of the convex lens 11 includes a plano-convex lens as well as a biconvex lens, a convex meniscus lens, and the like.

The mirror 6 guides the laser beam P that transmits through the beam expander 5 to the light converging lens 9. Travel direction of the laser beam P can be easily regulated by changing the reflection angle of the laser beam P using this mirror 6. Regulation means of the reflection angle of the laser beam P using this mirror 6 is not particularly limited, and a well-known means may be employed.

The birefringent lens 7 is specifically a simple lens, and a birefringent material 25 is used as its material entity. This birefringent lens 7 splits the entered laser beam P into two electric field components, and forms two beam waists. With respect to details of such a construction shown in FIG. 2, the laser beam P emitted from the light source 1 is linearly polarized in the electric field direction initially, and phase contrast is generated by transmitting through the half-wave plate 4. Thereafter, the laser beam P entered into the birefringent lens 7 is split into component $E_x$ that is perpendicular to crystallographic axis S, and component $E_y$ that is orthogonal thereto. The component $E_x$ transmits as an ordinary light 12, whereas the component $E_y$ transmits as an extraordinary light 13. Examples of the type of the birefringent lens 7 include a biconvex lens, a piano-convex lens, a convex meniscus lens, a biconcave lens, a plano-concave lens, a concave meniscus lens, and the like.

In this manner, the birefringent lens 7 is characteristic in having two different refractive indices, and the difference in these refractive indices can be utilized for splitting the entered laser beam P into the ordinary light 12 and the extraordinary light 13, thereby forming different focal points. Such a characteristic permits determination of the waist diameter and the waist interval of the two beam waists. Therefore, in the irradiation optical system, for example, when various birefringent lenses having different characteristics are appropriately employed and the waist diameter and the waist interval of the two beam waists are adjusted, the most appropriate processing to meet the properties of the processed material is also enabled by a convenient means of exchanging the lens.

The direction of the crystallographic axis S of the birefringent lens 7 may be orthogonal to the direction of the optical axis of the irradiation optical system R. Accordingly, when the direction of the crystallographic axis S of the birefringent lens 7 is orthogonal to the direction of the optical axis of the irradiation optical system R, the direction of the crystallographic axis S agrees with the electric field direction, and as a result, components of the laser beam emitted from the light source can be surely and efficiently split into ordinary light and extraordinary light.

The material entity of the birefringent lens 7 is not particularly limited, and for example, optical crystalline quartz, sapphire, calcite or the like may be used. Among these, to use optical crystalline quartz is preferred. When optical crystalline quartz is used as the material entity of this birefringent lens 7, high intensity of light resistance against laser beam can be achieved, along with high transmittance achievable for a wide wavelength range. Refractive indices for typical laser wavelength of such a birefringent lens 7 produced using optical crystalline quartz as a material entity ($n_o$: refractive index of ordinary light; and $n_e$: refractive index of extraordinary light) are shown in Table 1 below. As shown in Table 1, it is proven that the birefringent lens 7 produced using optical crystalline quartz as a material entity had a value of $n_e$ greater than the value of $n_o$, and the extraordinary light corresponds to a short focal length point.

TABLE 1

| Typical laser wavelength (nm) | $n_o$ | $n_e$ |
| --- | --- | --- |
| 1064 | 1.53410 | 1.54282 |
| 532 | 1.54689 | 1.55610 |
| 355 | 1.56463 | 1.57446 |

In addition, with respect to birefringency of such a birefringent lens 7 produced using optical crystalline quartz as a material entity, focal lengths ($f_o$: focal length of ordinary light, $f_e$: focal length of extraordinary light) of plano-convex lens made of optical crystalline quartz having a curvature radius R of 100 mm determined by paraxial calculation are shown in Table 2 below. As shown in Table 2, at a fundamental wave (1064 nm) of Nd: YAG laser, the $f_e$ value was smaller than the $f_o$ value; therefore it is revealed that the extraordinary light corresponds to a short focal length point.

| Typical laser wavelength (nm) | $f_o$ (mm) | $f_e$ (mm) |
| --- | --- | --- |
| 1064 | 187.23 | 184.22 |
| 532 | 182.85 | 179.82 |
| 355 | 171.11 | 174.08 |
| 266 | 169.02 | 166.00 |

The quarter-wave plate 8 is disposed backward of the birefringent lens 7, with respect to the travel direction of the laser beam P. This quarter-wave plate 8 converts linear polarization of the laser beam P transmitted through the birefringent lens 7 into circular polarization to exclude the influences of polarization. Thus ensured stabilization of processing characteristics enables a deeper focal depth to be surely and efficiently attained.

The light converging lens 9 is specifically a simple lens having optical aberration corrected for the wavelength of the laser light used, or a combined lens, which converges the laser beam P guided from the mirror 6 to the target substance Y. This light converging lens 9 converges the ordinary light 12 and extraordinary light 13 of the laser beam P transmitted through the quarter-wave plate 8 to different positions, respectively, on the optical axis of the irradiation optical system R, thereby enabling two beam waists to be formed. It is to be noted that the type of the lens that configures this light converging lens 9 may include, for example, a biconvex lens, a plano-convex lens, a convex meniscus lens, a biconcave lens, a plano-concave lens, a concave meniscus lens, and the like.

Operations and effects of the laser irradiation device are explained in detail below.

The diameter $2\omega_o$ of the beam waist formed by the laser irradiation device is calculated by the following mathematical formula 1 provided that: the focal length of the light converging lens is f; the beam diameter enters into the light converging lens is D; and the laser wavelength is λ. When a minute diameter of the beam waist is to be obtained, it is necessary to decrease the laser wavelength λ, to reduce the focal length f, and to increase the beam diameter D enters into the light converging lens in the following mathematical formula 1.

$$2\omega_0 = \frac{4 \times \lambda \times f}{\pi \times D} \quad \text{[mathematical formula 1]}$$

Rayleigh length $d_f$ of the laser beam emitted from the laser irradiation device is calculated by the following mathematical formula 2 provided that the radius of the beam waist is $\omega_o$, and the laser wavelength is λ. In general, in order to be less likely to be affected by defocusing of the laser beam, it is necessary to form a beam having a greater Rayleigh length. According to the following mathematical formula 2, the Rayleigh length $d_f$ is closely related to the radius $\omega_o$ of the beam waist. Thus, in order to achieve a beam waist having a large focal depth (great Rayleigh length), it is necessary to increase the radius $\omega_o$ of the beam waist when the wavelength λ is kept constant. On the other hand, greater radius $\omega_o$ of the beam waist results in difficulty in fine processing.

$$d_f = \pm \frac{\pi \omega_0^2}{\lambda}. \quad \text{[mathematical formula 2]}$$

Figure 3:
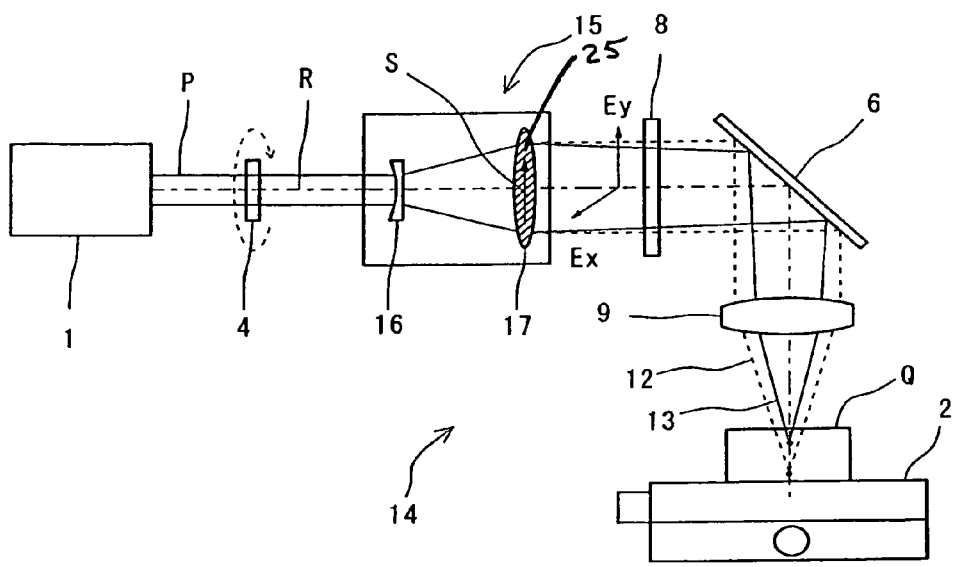
FIG. 3 shows a schematic configuration diagram illustrating a laser irradiation device according to other embodiment different from the laser irradiation device shown in FIG. 1.

The laser irradiation device shown in FIG. 3 is principally provided with a light source 1, a stage 2, and an irradiation optical system 14. Since the light source 1 and the stage 2 are similar to those in the laser irradiation device shown in FIG. 1, their explanations are omitted by denoting with the same number.

The irradiation optical system 14 guides and converges the laser beam P emitted from the light source to the target substance Q. This irradiation optical system 14 has a half-wave plate 4, a beam expander 15, a quarter-wave plate 8, a mirror 6 and a light converging lens 9 in the order along the travel direction of the laser beam P. Since the laser beam P, the target substance Q, the half-wave plate 4, the quarter-wave plate 8, the mirror 6 and the light converging lens 9 are similar to those in the laser irradiation device shown in FIG. 1, their explanations are omitted by denoting with the same number.

The beam expander 15 has a concave lens 16 that is the first lens and a convex lens 17 that is the second lens, in the order along the travel direction of the laser beam P, and a birefringent material 25 is used as the material entity of this convex lens 17. The beam expander 15 is configured so as to enable the interval between the concave lens 16 and the convex lens 17 to vary. Thus, the waist interval can be easily adjusted without greatly changing the diameters of two beam waist emitted from the irradiation optical system 14, and the most appropriate processing to meet the processed material can be realized by a convenient means. In addition, the interval of the concave lens 16 and the convex lens 17 can be adjusted by shifting either one or both of the concave lens 16 and the convex lens 17 along the direction of the optical axis R of the irradiation optical system 14. Means for shifting the lens is not particularly limited, and any well-known means may be employed.

Figure 4:
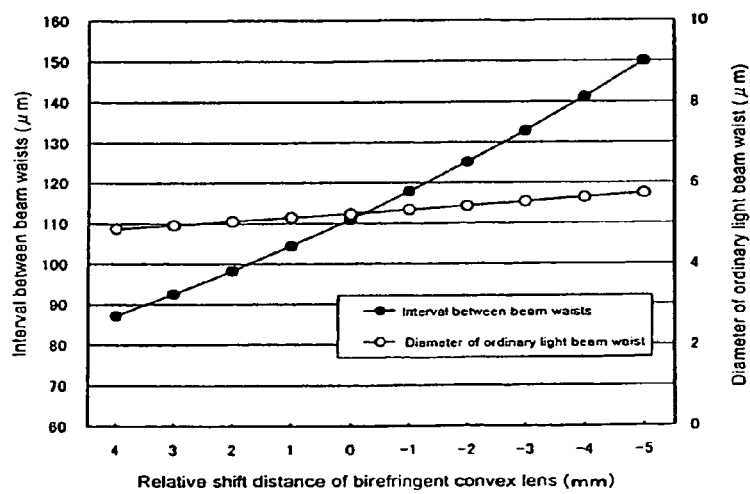
FIG. 4 shows a graph illustrating results of estimation of a pattern of alteration of intervals of two beam waists, and the diameters of the beam waists when intervals between the lenses (relative shift distance of the birefringent convex lens) of the beam expander of the laser irradiation device shown in FIG. 3 were altered.

FIG. 4 shows a graph illustrating results of estimation of a pattern of alteration of intervals of two beam waists, and the diameters of the beam waists (ordinary light) when the interval between the concave lens 16 and the convex lens 17 was changed. The abscissa in FIG. 4 represents the interval between the concave lens 16 and the convex lens 17 in terms of a distance (relative shift distance) attained by relatively shifting the convex lens 17 with respect to the concave lens 16. In addition, the magnification as a beam expander 15, and the focal length of the light converging lens 9 are selected so as to set the final diameter of the beam waist of about 5 µm. As shown in FIG. 4, when the interval between the lenses is altered by about 9 mm, the interval between both beam waists varies from 90 µm to 150 µm, whereas the diameter of the beam waist varies within the range of from 5 µm to 6 µm. Therefore, since the beam expander 15 can change the interval between both beam waists without greatly altering the diameter of the beam waist, laser processing for a small diameter and a great focal depth can be realized to adapt to the properties of the processed material.

Figure 5:
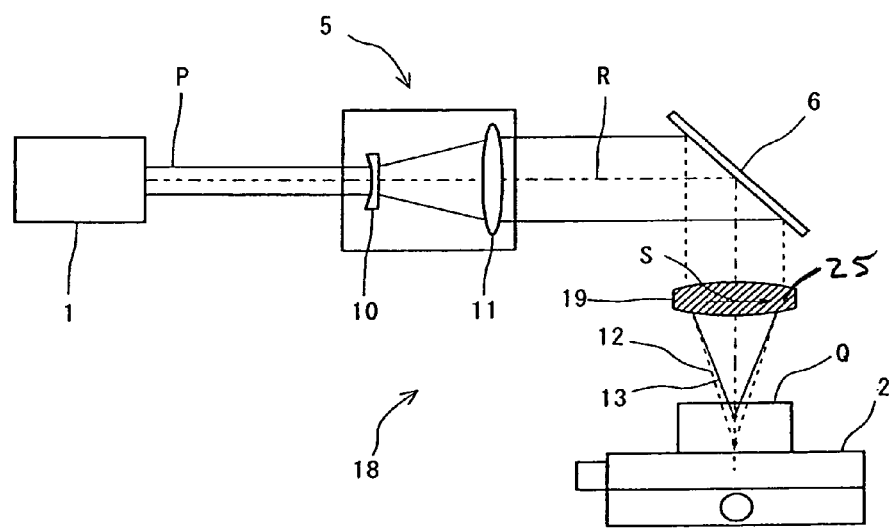
FIG. 5 shows a schematic configuration diagram illustrating a laser irradiation device according to other embodiment different from the laser irradiation device shown in FIG. 1 and FIG. 3.

The laser irradiation device shown in FIG. 5 is principally provided with a light source 1, a stage 2, and an irradiation optical system 18. Since the light source 1 and the stage 2 are similar to those in the laser irradiation device shown in FIG. 1, their explanations are omitted by denoting with the same number.

The irradiation optical system 18 guides and converges the laser beam P emitted from the light source 1 to the target substance Q. This irradiation optical system 18 has a beam expander 5, a mirror 6, and a light converging lens 19 in the order along the travel direction of the laser beam P. Since the laser beam P, the target substance Q, the beam expander 5 and the mirror 6 are similar to those in the laser irradiation device shown in FIG. 1, their explanations are omitted by denoting with the same number.

The light converging lens 19 is provided for converging the laser beam P guided from the mirror 6 to the target substance, and a birefringent material 25 is used as the material entity therefor. The light converging lens 19 has a function of converging the laser beam P, and also has a function of splitting the laser beam P into the ordinary light 12 and the extraordinary light 13 to form two beam waists. Therefore, two beam waists can be easily formed using one lens having a light converging property and birefringency without separately providing and disposing additional lens produced using a birefringent material as the material entity, and thus simplification of the irradiation optical system can be ensured, and reduction in costs can be achieved.

In these regards, a laser processing method in which the laser irradiation device shown in FIG. 1, the laser irradiation device shown in FIG. 3, or the laser irradiation device shown in FIG. 5 is used can be also constructed. According to such a laser processing method, a plurality of beam waists can be formed with, for example, intervals that result in a crack in the target substance. Also, when one beam waist is disposed in the vicinity of the surface of the target substance, and another beam waist is disposed to the interior the target substance, a processed crack can be induced that runs from the surface to the interior of the target substance.

Additionally, in the laser processing method, intervals of the plurality of beam waists formed by the laser irradiation device may be adjustable to be from 0.5 times to 10 times the Rayleigh length. Such adjustment enables influences of defocusing of the laser beam to be avoided, and a great focal depth can be attained while maintaining a small diameter of the beam waist. In order to adjust the length with respect to the Rayleigh length, for example, the birefringent lens may be relatively shifted in the direction along the optical axis of the irradiation optical system R, and specific adjusting means is not particularly limited and any well-known means may be employed.

The laser irradiation device of present invention, and the laser processing method using the same is not limited to the foregoing embodiments. For example, when the light converging lens 19 of the laser irradiation device shown in FIG. 5 has a means for relatively shifting along the direction of the optical axis R of the irradiation optical system 18, positions of two beam waists can be easily adjusted, and a more simple and convenient irradiation optical system can be realized.

Moreover, in the case in which to distinguish polarization orientations of two beam waists depending on properties of the processed material is envisaged to be efficacious, polarization orientations of the upper and under beam waist will be orthogonal to one another if a quarter-wave plate is not disposed in the irradiation optical system, whereby the processed groove width can be increased and the focal depth can be diminished.

EXAMPLES

Hereinafter, the present invention is explained in detail by way of Examples, but the present invention should not be construed as being limited to these Examples.

Experiment 1

Example 1 and Example 2

Explanation of Experimental System

Using an irradiation optical system provided with at least a light source, a beam expander, a half-wave plate and a light converging lens, one or two beam waists were arranged inside a borosilicate glass which can be readily observed on processing traces, whereby a processed groove was formed. Thereafter, a cross-sectional view orthogonal to this processed groove was photographed.

The beam expander used in Examples 1 and 2 was provided with a concave lens and a convex lens having birefringency, and was configured so as to make the interval between both lenses be variable. By changing the interval between both lenses (Lm), the interval of two beam waists formed on the optical axis can be altered. In addition, when the half-wave plate used in Examples 1 and 2 was rotated around the optical axis of the irradiation optical system, laser power distribution at two light converging spots can be altered.

Comparative Example 1

The irradiation optical system used in Comparative Example 1 has a typical configuration, provided with at least light source, a beam expander and a light converging lens, in which the convex lens of the beam expander does not have birefringency and does not include a half-wave plate.

Evaluation of Characteristics

Figure 7:
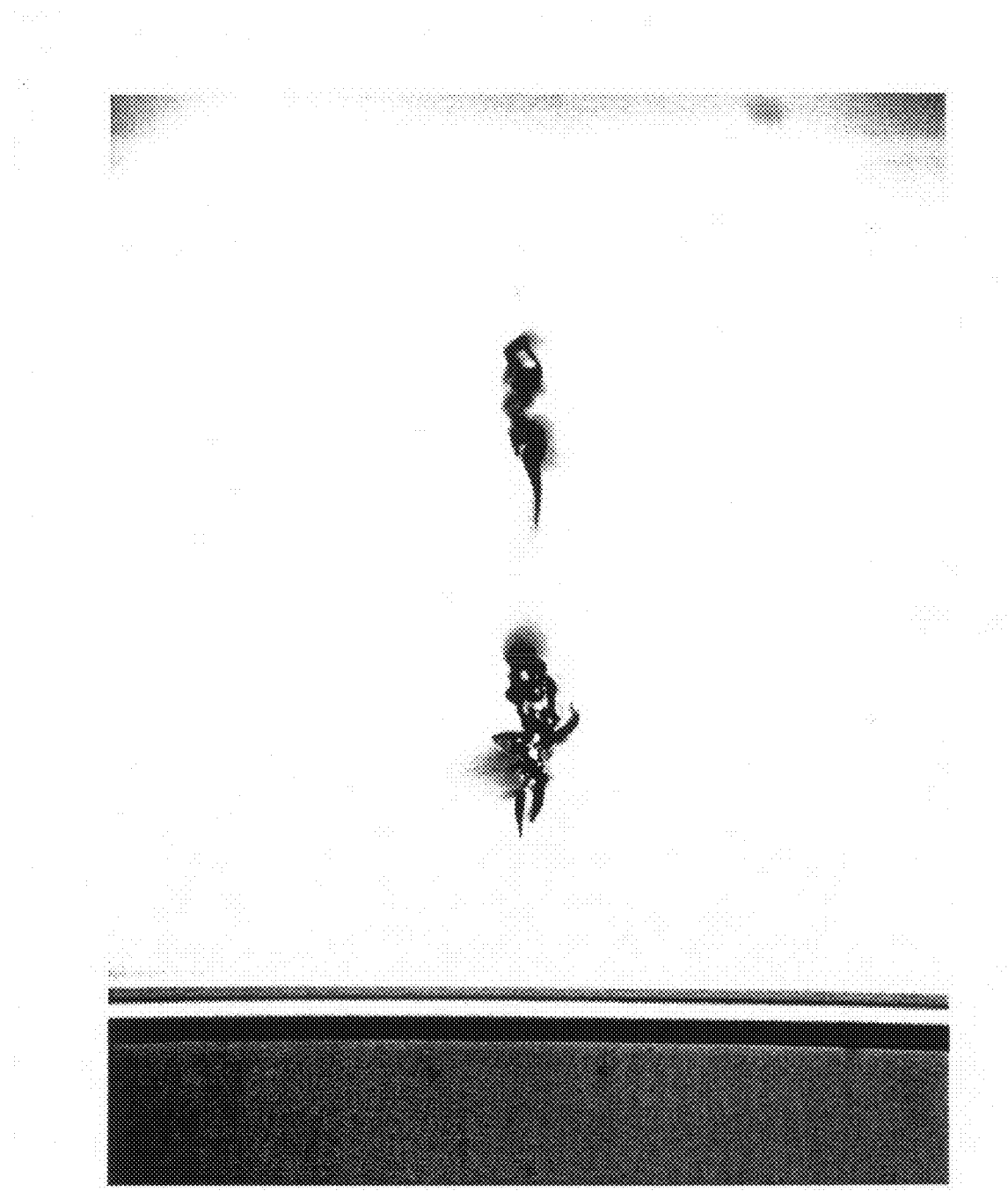
FIG. 7 shows a cross-sectional view illustrating a processed groove formed on the borosilicate glass by two-spot irradiation in Example 1.
Figure 8:
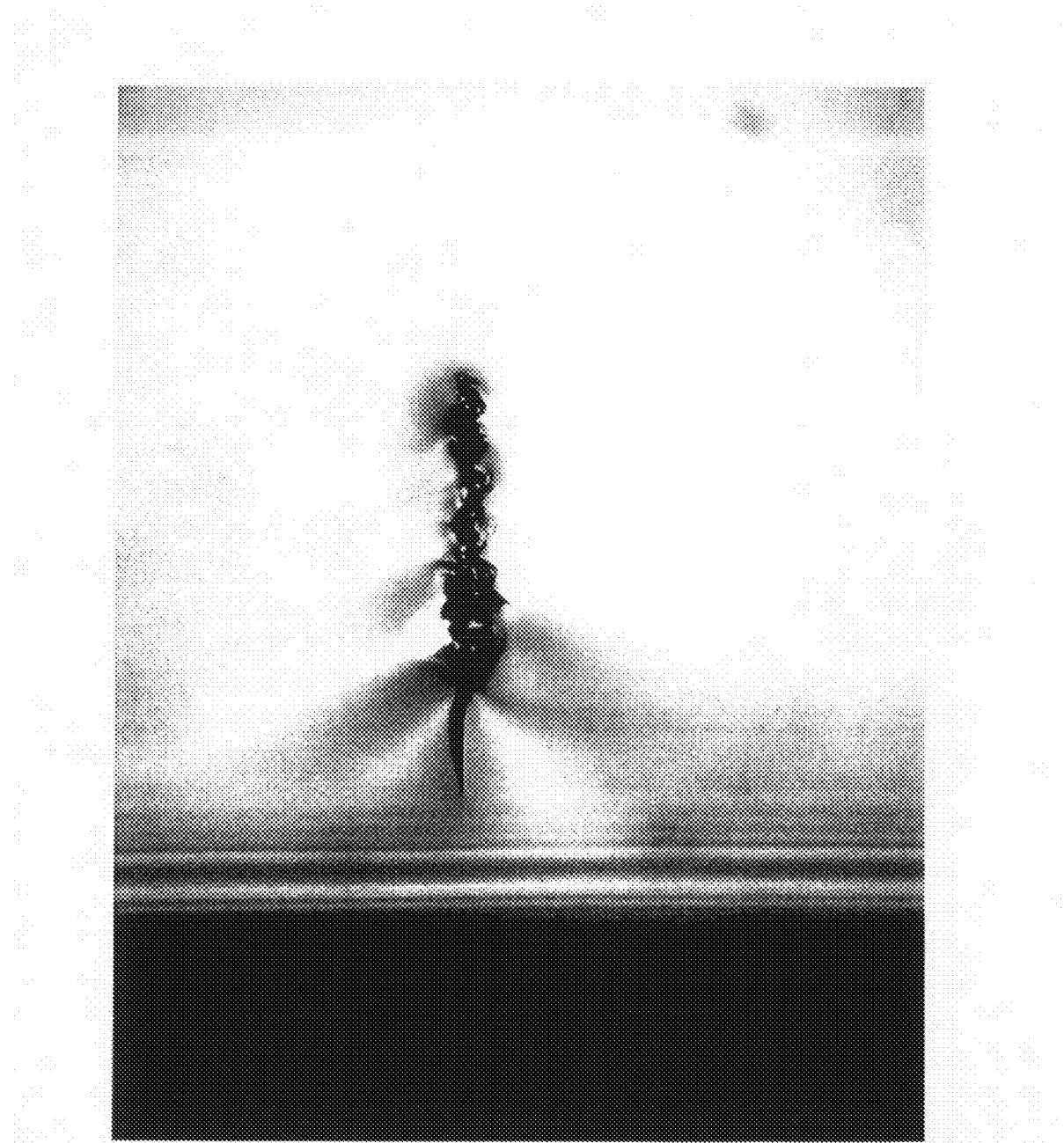
FIG. 8 shows a cross-sectional view illustrating a processed groove formed on the borosilicate glass by decreasing intervals between two spots in Example 2.

The processing conditions and experimental results are shown in Table 3 below, and FIG. 6 to FIG. 8.

TABLE 3

| Processing conditions | Unit | Example 1 | Example 2 | Comparative Example 1 |
|---|---|---|---|---|
| Material of processed object | — | borosilicate glass | borosilicate glass | borosilicate glass |
| Laser wavelength | nm | 355 | 355 | 355 |
| Mean power on the processed face | W | 1.0 | 1.0 | 1.0 |
| Q switch rate | kHz | 50 | 50 | 50 |
| Processing speed | mm/s | 100 | 100 | 100 |
| Number of light converging waists (spot number) | piece | 2 | 2 | 1 |
| Interval between expander lenses Lm | mm (relative value) | 0 | −10 | — |
| Power component: upper/lower waist | % | 50/50 | 50/50 | — |
| Waist interval | µm | about 190 | about 90 | — |
| Diameter of beam waist | µmϕ | — | — | about 2.1 |
| Upper waist  diameter of beam waist | µmϕ | 3.8 | 2.9 | — |
| Upper waist  power density | W/cm² | $0.7 \times 10^{10}$ | $1.3 \times 10^{10}$ | — |
| Lower waist  diameter of beam waist | µmϕ | 3.5 | 2.6 | — |
| Lower waist  power density | W/cm² | $0.9 \times 10^{10}$ | $1.5 \times 10^{10}$ | — |
| Length of processed groove | µm | about 60 + about 70 | about 180 | about 100 |

Figure 6:
FIG. 6 shows a cross-sectional view illustrating a processed groove formed on the borosilicate glass by one-spot irradiation in Comparative Example 1.

In Comparative Example 1, a processed groove having a length of about 100 µm was formed on the optical axis of the irradiation optical system direction, i.e., along the thickness direction of the borosilicate glass (FIG. 6). On the other hand, in Example 1, two waist intervals (center intervals) were about 190 µm, and the lengths of processed grooves induced by respective waist were about 60 µm and about 70 µm (see FIG. 7). The lengths of two processed grooves in Example 1 (about 60 µm and about 70 µm) were shorter as compared with the length (about 100 µm) when processed on one spot in Comparative Example 1. Therefore, it is believed that a laser power to be converged to one spot was split into two spots in Example 1.

In Example 2, for the purpose of forming a long processed groove along the thickness direction of the borosilicate glass, the interval between the convex lens and the convex lens having birefringency was set to be small in order to decrease the interval of two waists. Specifically, the interval between the expander lenses Lm was decreased by 10 mm as compared with that upon processing in Example 1, and as a result, processed grooves introduced by both waists are linked to form a processed groove having an entire length of 180 µm at most (FIG. 8). Thus, the length of the processed groove in Example 2 (about 180 µm) was revealed to be longer than the length of the processed groove in Comparative Example 1 (about 100 µm). In general, a high laser power is required when a long processed groove is to be formed on one spot, and it has been known that a site affected by processing is formed with a significantly great width concomitant with increase in the width of the processed groove, even if a deep processed groove can be formed similarly to Example 2. Therefore, it is believed that groove processing capable of attaining a great focal depth was able to be realized with a less laser power while minimizing the range affected by processing along the groove width direction in Example 2.

Experiment 2

Example 3 and Example 4

Explanation of Experimental System

The experimental system was similar to those of Example 1 and Example 2 in the Experiment 1. In Experiment 2, the interval between the expander lenses Lm was kept constant, and the half-wave plate was rotated around the optical axis of the irradiation optical system to alter the power distribution of two waists.

Evaluation of Characteristics

The processing conditions and experimental results are shown in Table 4 below, and FIG. 9 and FIG. 10.

| Processing conditions | Unit | Example 3 | Example 4 |
|---|---|---|---|
| Material of processed object | — | borosilicate glass | borosilicate glass |
| Laser wavelength | nm | 355 | 355 |
| Mean power on the processed face | W | 0.61 | 0.61 |
| Q switch rate | kHz | 35 | 35 |
| Processing speed | mm/s | 100 | 100 |
| Number of light converging waists (spot number) | piece | 1 (lower alone) | 2 |
| Interval between expander lenses Lm | mm (relative value) | fixed | fixed |

-continued

| Processing conditions | | Unit | Example 3 | Example 4 |
|---|---|---|---|---|
| Power component: upper/lower waist | | % | 0/100 | 30/70 |
| Waist interval | | μm | about 190 | about 90 |
| Upper | diameter of beam waist | μmφ | — | 3.2 |
| Waist | power density | W/cm$^2$ | — | $0.9 \times 10^{10}$ |
| Lower | diameter of beam waist | μmφ | 3.0 | 3.0 |
| Waist | power density | W/cm$^2$ | $3.5 \times 10^{10}$ | $2.5 \times 10^{10}$ |

Figure 9:
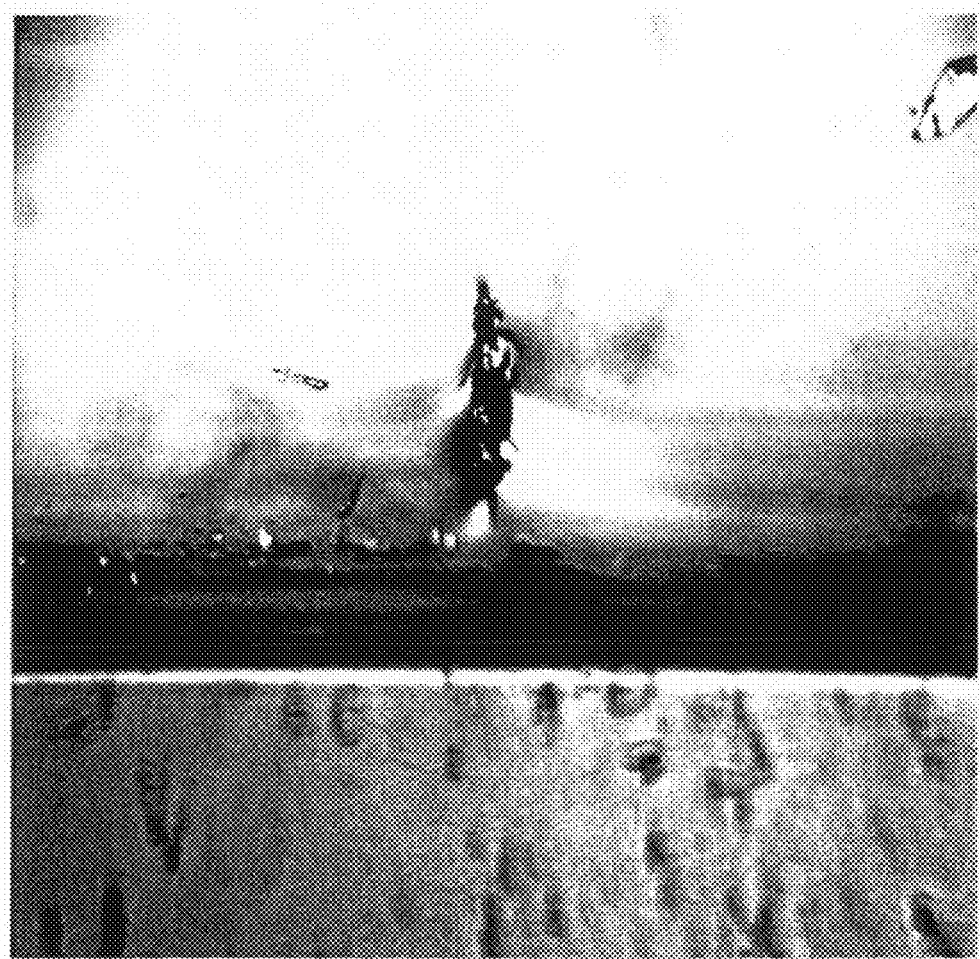
FIG. 9 shows a cross-sectional view illustrating a processed groove formed on the borosilicate glass by converging the power to one spot in Example 3.
Figure 10:
FIG. 10 shows a cross-sectional view illustrating a processed groove formed on the borosilicate glass by altering the power ratio of two spots in Example 4.
Figure 1:
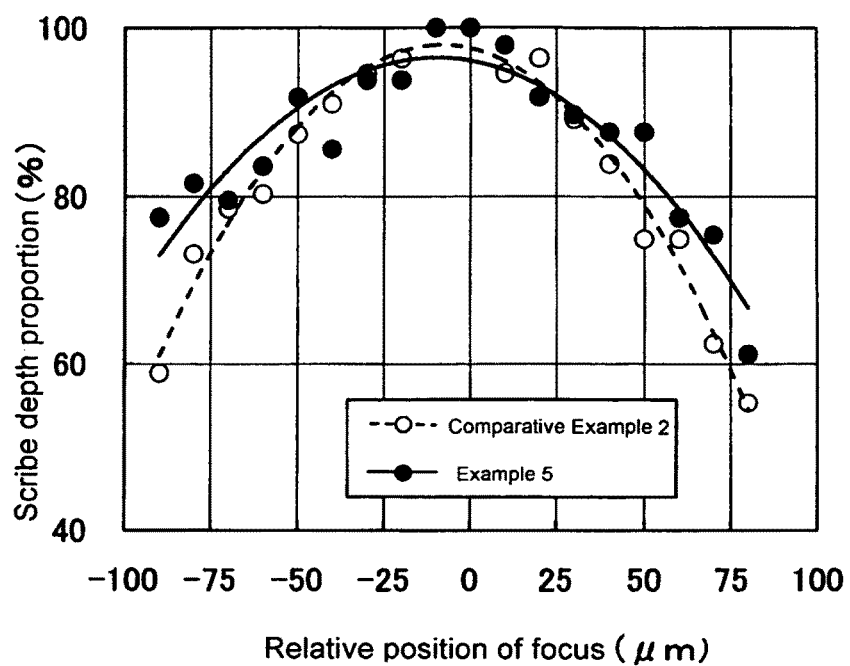

In Example 3, all the laser power was converged to the lower waist, and thus the processing was carried out on one spot (FIG. 9). On the other hand, in Example 4, the half-wave plate was rotated to carry out the processing such that the components of the laser power were divided into the upper waist: maximum 30%, and the lower waist: maximum 70% (FIG. 10). In Example 3, only one processing site was formed inside the borosilicate glass; however, when the laser power was divided into two waists in Example 4, the processing site was formed also in the vicinity of the surface. In other words, it is believed that a processed groove having a greater focal depth could be formed in Example 3 and Example 4 by form two waists along the optical axis direction with an arbitrary interval, and generating a crack using strain stress produced between respective processing sites, in addition to the original length of the groove at the processing site induced by respective waists.

Experiment 3

Example 5 and Comparative Example 2

Explanation of Experimental System

In Experiment 3, achieving a processing to provide a great focal depth while maintaining a small diameter of the beam waist was studied. Details of the experimental system in Experiment 3 are as shown in FIG. 1, and the beam expander had a standard lens configuration in which a concave lens and a convex lens were disposed, whereas a convex lens having birefringency was disposed immediately ahead of the light converging lens together with a quarter-wave plate. It should be noted that the interval between beam waists was set such that the Rayleigh lengths of both of the waists overlapped, but this interval is not always most appropriate.

In Comparative Example 2, groove processing was carried out with the aforementioned configuration, on one spot of the lower waist to which all the laser power was converged. Additionally, in Example 5, groove processing was carried out on two spots with the laser power equally divided into the upper and lower spots. Accordingly, correlations between each amount of defocusing (i.e., relative position of the focus) and the depth of the groove (i.e., scribe depth proportion) in Example 5 and Comparative Example 2 were studied (see FIG. 11).

Evaluation of Characteristics

The processing conditions and experimental results are shown in Table 5 below, and FIG. 11. The values of waist diameter, the Rayleigh length and the power density exhibited in Example 5 were almost the same between two beam waists.

| Processing conditions | unit | Example 5 | Comparative Example 2 |
|---|---|---|---|
| Material of processed object | | alumina ceramics | alumina ceramics |
| laser wavelength | nm | 1064 | 1064 |
| Mean power of laser | W(kHz) | 8(50) | 8(50) |
| Number of light converging waists (spot number) | number | 2 | 1 |
| Power components: upper/lower waist | % | 50/50 | 0/100 |
| Waist interval | μm | 98 | — |
| Diameter of beam waist | μmφ | 9.3 | 9.1 |
| Rayleigh length | μm | 55.5 | 50.5 |
| Power density | W/cm$^2$ | $7.9 \times 10^8$ | $8.3 \times 10^8$ |

From FIG. 11, it is revealed that with respect to defocusing from the position of the focal point at which a maximum scribe depth was attained, the variation of the scribe depth was less in Example 5 as compared with Comparative Example 2. Therefore, resistance against defocusing was indicated in Example 5.

INDUSTRIAL APPLICABILITY

As in the foregoing, the laser irradiation device of the present invention and the laser processing method performed using the same enable processed grooves and processed holes that are fine and have a great focal depth to be easily formed to meet processing characteristics and processing qualities of the processing target substance using a simple and convenient irradiation optical system. Therefore, facilitation of the operation, and simplification of the device, as well as reduction in costs are enabled, and thus broad application in the field of laser processing is permitted.

EXPLANATION OF THE REFERENCE SYMBOLS

1: light source
2: stage
3: irradiation optical system
4: half-wave plate
5: beam expander
6: mirror
7: birefringent lens
8: quarter-wave plate
9: light converging lens
10: concave lens
11: convex lens
12: ordinary light
13: extraordinary light
14: irradiation optical system
15: beam expander
16: concave lens
17: birefringent convex lens
18: irradiation optical system
19 birefringent light converging lens P: laser beam
Q: target substance
R: optical axis
S: crystallographic axis

The invention claimed is:

1. A cutting processing device, comprising:
a light source that emits a laser beam; and
an irradiation optical system which has a plurality of lenses, and is provided for light-guiding and light-converging the laser beam emitted from the light source to a board formed from a hard and brittle material;
wherein the irradiation optical system comprises a beam expander having a first lens that is a concave lens or a convex lens, and a second lens that is a convex lens, in order along a laser-beam travel direction, the beam expander being configured so as to make an interval between the first lens and the second lens variable, the irradiation optical system further comprising a light converging lens, disposed at a last position along the laser-beam travel direction, configured to form a groove on a surface of the board by irradiating the board with the laser beam; and
wherein a birefringent material that splits the laser beam into an ordinary light beam and an extraordinary light beam is used as a material entity of at least one of the first lens and the second lens to form two beam waists, wherein an interval between the beam waists along an optical axis direction of the irradiation optical system is altered depending on the interval between the first lens and the second lens.

2. The cutting processing device according to claim 1, wherein an optical axis of all of the lenses produced using the birefringent material as a material entity is orthogonal to the optical axis direction of the irradiation optical system.

3. The cutting processing device according to claim 1, wherein the birefringent material is crystalline quartz.

4. The cutting processing device according to claim 1, which comprises a relative shifting means for allowing a position of the board to relatively shift with respect to the irradiation optical system in two orthogonal directions on a face that is perpendicular to an optical axis of the irradiation optical system, and also in the optical axis direction.

5. The cutting processing device according to claim 1, wherein
the irradiation optical system comprises a half-wave plate that is rotatable about an optical axis, and
the half-wave plate is disposed ahead of all of the lenses produced using the birefringent material as a material entity, with respect to the laser-beam travel direction.

6. The cutting processing device according to claim 1, wherein the irradiation optical system comprises a quarter-wave plate, and
the quarter-wave plate is disposed backward of all of the lenses produced using the birefringent material as a material entity, with respect to the laser-beam travel direction.

7. The cutting processing device according to claim 1, wherein the laser beam has a wavelength that is 200 nm or greater and 11 μm or less.

8. The cutting processing device according to claim 1, wherein an oscillation means of the laser beam is for continuous-wave operation or pulse operation.

9. A cutting processing device, comprising:
a light source that emits a laser beam; and
an irradiation optical system configured to guide and converge the laser beam to achieve a power density at which the laser beam cuts a groove in a board formed from a hard and brittle material; and
wherein the irradiation optical system comprises a beam expander and a converging lens;
wherein the beam expander comprises a first lens that is a concave lens or a convex lens and a second lens that is a convex lens, in order along a laser-beam travel direction;
wherein the light converging lens is disposed at a last position along the laser-beam travel direction and converges the laser beam to achieve said power density to cut said groove in said board with said laser beam;
wherein the beam expander is configured to provide a variable first interval between the first lens and the second lens;
wherein a birefringent material forms a material entity of at least one of said first lens and second lens so as to configure the beam expander to form two beam waists at a second interval along an optical axis direction of the irradiation optical system, which second interval is determined by the variable first interval between the first lens and the second lens so that said variable first interval regulates a length of said second interval without significantly altering respective diameters of the two beam waists.

* * * * *